(12) United States Patent
Tille

(10) Patent No.: US 11,046,146 B2
(45) Date of Patent: Jun. 29, 2021

(54) CONTROL ELEMENT

(71) Applicant: Bayerische Motoren Werke Aktiengesellschaft, Munich (DE)

(72) Inventor: Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 473 days.

(21) Appl. No.: 15/946,354

(22) Filed: Apr. 5, 2018

(65) Prior Publication Data

US 2018/0222285 A1 Aug. 9, 2018

Related U.S. Application Data

(63) Continuation of application No. PCT/EP2016/074558, filed on Oct. 13, 2016.

(30) Foreign Application Priority Data

Oct. 29, 2015 (DE) ...................... 10 2015 221 123.1

(51) Int. Cl.
*G01K 13/02* (2021.01)
*B60H 1/00* (2006.01)
(Continued)

(52) U.S. Cl.
CPC ......... *B60H 1/00807* (2013.01); *B60K 37/06* (2013.01); *G01J 5/0014* (2013.01); *G01K 1/14* (2013.01); *G01K 7/22* (2013.01); *G01K 13/02* (2013.01); *B60K 2370/126* (2019.05); *B60K 2370/141* (2019.05);
(Continued)

(58) Field of Classification Search
CPC .......... G01K 7/00; G01K 13/00; H01H 71/04; H01H 73/30; H01H 37/74; H01H 85/36; H01H 37/5427; H01H 1/0036; H01H 2061/006; H01H 2061/008; H01H 71/16; H01H 71/2472; B60H 1/00807;
(Continued)

(56) References Cited

U.S. PATENT DOCUMENTS 3,496,511 A * 2/1970 Colavecchio ...... H01H 37/5427
 337/343
3,882,440 A * 5/1975 Hollweck .............. H01H 37/54
 337/354

(Continued)

FOREIGN PATENT DOCUMENTS

CN 2527290 Y * 12/2002
CN 102971693 A 3/2013
(Continued)

OTHER PUBLICATIONS

Chinese-language Office Action issued in counterpart Chinese Application No. 201680041441.3 dated Oct. 21, 2019 with English translation (18 pages).

(Continued)

*Primary Examiner* — Gail Kaplan Verbitsky
(74) *Attorney, Agent, or Firm* — Crowell & Moring LLP

(57) ABSTRACT

A control element, in particular a mechatronic control element of a motor vehicle, for an electronic component, includes a sensor integrated in the control element. An electronic component having such a control element, and a motor vehicle with such an electronic component, are also provided.

12 Claims, 1 Drawing Sheet

(51) Int. Cl.
    *B60K 37/06* (2006.01)
    *G01J 5/00* (2006.01)
    *G01K 1/14* (2021.01)
    *G01K 7/22* (2006.01)
    *G05G 1/08* (2006.01)
    *G01K 13/024* (2021.01)

(52) U.S. Cl.
    CPC .. *B60K 2370/1537* (2019.05); *B60K 2370/48* (2019.05); *G01K 13/024* (2021.01); *G05G 1/08* (2013.01)

(58) Field of Classification Search
    CPC .............. B60K 37/06; B60K 2370/126; B60K 2370/143; B60K 2370/48; B60K 2370/1537
    USPC ..... 345/173, 184, 156; 337/20, 46; 374/141, 374/208
    See application file for complete search history.

(56) References Cited

U.S. PATENT DOCUMENTS

| | | | | |
|---|---|---|---|---|
| 4,001,753 | A * | 1/1977 | Hazleton | H01H 37/04 337/380 |
| 5,142,266 | A * | 8/1992 | Friese | G01K 7/223 338/22 R |
| 6,137,165 | A * | 10/2000 | Thierry | H03K 17/0822 257/690 |
| 6,154,117 | A * | 11/2000 | Sato | H01H 1/66 337/354 |
| 6,431,459 | B1 * | 8/2002 | Humburg | B60H 1/2209 237/2 A |
| 6,619,556 | B1 * | 9/2003 | Snider | B60H 1/00792 236/49.3 |
| 6,768,412 | B2 * | 7/2004 | Becka | H01H 1/0036 251/129.02 |
| 8,626,387 | B1 * | 1/2014 | Nagata | G06F 3/038 701/36 |
| 8,796,566 | B2 * | 8/2014 | Kerner | H01H 25/06 200/4 |
| 10,798,523 | B2 * | 10/2020 | Zakaria | H04W 4/80 |
| 2004/0118181 | A1 | 6/2004 | Kathan | |
| 2004/0132498 | A1 | 7/2004 | Clabunde et al. | |
| 2007/0008305 | A1 | 1/2007 | Kosinski, II et al. | |
| 2009/0140993 | A1 | 6/2009 | Han et al. | |
| 2009/0245324 | A1 | 10/2009 | Sunaga et al. | |
| 2011/0140818 | A1 | 1/2011 | Hatanaka et al. | |
| 2011/0128991 | A1 | 6/2011 | Regensburger et al. | |
| 2013/0048857 | A1 | 2/2013 | Hasselbrinck et al. | |
| 2013/0271157 | A1 | 10/2013 | Buttolo et al. | |
| 2014/0210795 | A1 | 7/2014 | Mattes et al. | |
| 2015/0123941 | A1 | 5/2015 | Fujioka | |
| 2016/0062489 | A1 * | 3/2016 | Li | G08C 23/04 345/163 |
| 2016/0309780 | A1 * | 10/2016 | Chen | A24F 47/008 |
| 2020/0221295 | A1 * | 7/2020 | Altin | H04W 12/003 |

FOREIGN PATENT DOCUMENTS

| | | | | |
|---|---|---|---|---|
| CN | 103513682 A | * | 1/2014 | |
| CN | 103782260 A | | 5/2014 | |
| CN | 103858088 A | | 6/2014 | |
| CN | 104635977 A | | 5/2015 | |
| CN | 206546755 U | * | 10/2017 | |
| DE | 199 36 257 A1 | | 2/2001 | |
| DE | 10002217 A1 | * | 8/2001 | ........... B60H 1/2212 |
| DE | 100 22 450 A1 | | 12/2001 | |
| DE | 10 2006 011 276 B3 | | 9/2007 | |
| DE | 10 2013 206 108 A1 | | 10/2013 | |
| DE | 102016200931 A1 | * | 7/2017 | ............... H05B 3/84 |
| EP | 1460506 A2 | * | 9/2004 | ......... G05D 23/1905 |
| EP | 1 382 008 B1 | | 8/2006 | |
| EP | 2561426 B1 | * | 7/2018 | ........... G06F 3/0338 |
| JP | 02001015655 A | * | 1/2001 | |
| JP | 2010236752 A | * | 10/2010 | |
| JP | 2012008769 A | * | 1/2012 | |
| WO | WO 2011/131364 A1 | | 10/2011 | |
| WO | WO2013060284 A1 | * | 5/2013 | |

OTHER PUBLICATIONS

International Search Report (PCT/ISA210) issued in PCT Application No. PCT/EP2016/074558 dated Dec. 21, 2016 with English translation (five pages).

German-language Written Opinion (PCT/ISA/237) issued in PCT Application No. PCT/EP2016/074558 dated Dec. 21, 2016 (five pages).

German-language Search Report issued in counterpart German Application No. 10 2015 221 123.1 dated Jul. 26, 2016 with partial English translation (11 pages).

Cover page of EP 2 561 426 A1 published Feb. 27, 2013 (one page).

Chinese-language Office Action issued in Chinese Application No. 201680041441.3 dated Nov. 4, 2020 with English translation (16 pages).

* cited by examiner

CONTROL ELEMENT

CROSS REFERENCE TO RELATED APPLICATIONS

This application is a continuation of PCT International Application No. PCT/EP2016/074558, filed Oct. 13, 2016, which claims priority under 35 U.S.C. § 119 from German Patent Application No. 10 2015 221 123.1, filed Oct. 29, 2015, the entire disclosures of which are herein expressly incorporated by reference.

BACKGROUND AND SUMMARY OF THE INVENTION

The present invention relates to a control element, in particular a mechatronic control element of a motor vehicle, for an electronic component. Furthermore, the invention relates to an electronic component having such a control element, as well as to a motor vehicle.

In order to collect status information, modern motor vehicles have a plurality of sensors, which, for the most part, are outwardly visible. Thus, for example, an air conditioning system has an internal temperature sensor for detecting the interior temperature in the passenger compartment. The internal temperature sensor is connected to a control device of the air conditioning system, which on the basis of the measured interior temperature then carries out a setpoint-actual comparison with the temperature that is set, and performs an adjustment of the interior temperature depending on the difference.

In a modern air conditioning system, the internal temperature sensor mentioned above is integrated in the system's user interface as a separate component. Such internal temperature sensors have a functional cap, which is arranged in an outwardly visible manner on the air conditioning control unit. In particular, the joints and/or materiality differences and/or the lack of straight alignment of the cap with the climate control element are visible. This makes the cap of the interior temperature sensor stand out from the design surface of the integration context of the climate control element. However, this provides an unappealing effect from a design point of view, and is therefore undesirable.

An object of the invention is to create a control element, an electronic component and a motor vehicle, which avoid a visible arrangement of a sensor from a design point of view.

As a solution, a control element, an electronic component, and a motor vehicle are provided in accordance with embodiments of the invention.

According to a first aspect of the invention, a control element, in particular a mechatronic control element of a motor vehicle, for an electronic component is provided. A sensor is integrated in the control element. The sensor can be a temperature sensor, more particularly an interior temperature sensor, in particular for a motor vehicle air conditioning system. The integration of the sensor in a control element, in particular in a mechatronic control element, avoids a design in which the sensor is in an exposed position, and achieves an efficient integration of the sensor in the available installation space. In addition, the integration of the sensor in a control element enables additional joints, which detract from the external appearance, to be avoided. In addition, the integration of the sensor in the control element achieves a reduction in the geometric installation space required. A functional advantage is also achieved, due to the fact that any masking or influencing of the sensor value is avoided.

Preferably, the sensor is integrated in a mechatronic control element, which is configured as a rotary control. The rotary control is preferably configured as the rotary volume knob or volume control of an audio control panel. In addition, the rotary control can also be configured as a control element of an infotainment system. In addition to the integration into a rotary control, the sensor can also be integrated into a button.

In an advantageous design, the control element has a core and a handling element, the handling element surrounding the core. The handling element allows the electronic component to be operated. Thus, for example, in the case of a control element configured as a rotary control for an audio control panel, the volume can be set. Preferably, the sensor is integrated in the core.

In a further advantageous design, the sensor has a cap, the cap being integrated in the handling element. The cap is preferably used as a covering element for the control element. In addition, the cap, in particular the material used therein, can be integrated in the control element, in particular as its cover. Therefore, the cap of the sensor can act as a design element for the control element. The cap can be connected to the handling element in a materially bonded and/or form-fitting manner. The cap can also function as protection for the sensor element of the sensor against environmental influences, such as dust, dirt or moisture. The cap can be connected to the sensor in a force-fitting and/or materially bonded manner.

In a further advantageous configuration, the material of the cap is selected based on the measuring procedure used by the sensor. The measurement can be based on different physical principles, wherein the sensor surface must be designed for a material which is suitable for the measurement. The material of the cap is selected based on the physical procedure used for the measurement. Thus, for example, by the selection of a measurement procedure, a material can be chosen for the cap, which affords an outwardly optically appealing and high-quality impression. The material used for the cap can be, for example, metal, plastic or brass.

In a further advantageous design, the core is stationary and the handling element is movable relative to the stationary core, the sensor being integrated in the core. Since the handling element is movable relative to the sensor integrated in the fixed core, it is possible by actuating the handle element, either by pressing or turning it, to control or activate one or more functions of the electronic component, wherein at the same time, for example, the sensor can measure the interior temperature in the passenger compartment.

In a further advantageous design, the core can be moved together with the handling element, the sensor being integrated in the region of the axis of motion. By actuating the handling element, either by turning or pressing it, one or more functions of the electronic component may be activated or selected, the sensor being moved along with it. The transmission of the acquired measurements, in particular their electrical signal transmission, for example, to the motor vehicle air conditioning system, in particular to a control device of the motor vehicle air conditioning system, can be effected via a suitable contact system. A suitable contact system can be configured as a slider spring system or an optical signal transmission system.

In a further advantageous design, the sensor has an interface for transmitting the measurements, for example to the motor vehicle air conditioning system. Via the interface, the measurements are forwarded to the motor vehicle air conditioning system, for example, in particular to a control device of the motor vehicle air conditioning system, which controls the interior temperature based on the measurement values. The interface may, in particular in the case of a stationary core, be configured in the form of cables. It is also possible for the interface, in particular in the case of a movable core in which the sensor is integrated, to be configured as a slider spring system or as an optical signal transmission system. In addition, it is contemplated to configure the interface as a plug-in system.

In a further advantageous design, the control element is configured as a rotary control. Advantageously, the control element is configured as a rotary control of a mechatronic control element, such as a mechatronic control element of an audio control panel or an infotainment system. If a sensor is integrated in a stationary core, then the rotary control can rotate relative to the sensor integrated in the stationary core. If the sensor is integrated in a non-stationary core, then the sensor rotates along with the core when the rotary control is actuated around the rotary control axis.

In a further advantageous design, the sensor is a temperature sensor, an air quality sensor, a humidity sensor, a gesture sensor, a proximity sensor or a brightness sensor.

In a further advantageous design, the temperature sensor is configured as an NTC sensor. NTC sensors are inexpensive commercially-available parts. When an NTC sensor is used as a temperature sensor, the cap is preferably made of brass.

In a further advantageous design, the temperature sensor is configured as an IR sensor. A temperature sensor which is configured as an IR sensor is available as an inexpensive commercially-available part. In the case of a temperature sensor configured as an IR sensor, the cap is preferably made of an IR-radiation-permeable plastic.

In a further aspect of the invention, an electronic component having a control element, in particular a mechatronic control element, is provided. The electronic component is characterized by the integration of a sensor, in particular a temperature sensor, more particularly an interior temperature sensor, in the control element of said component, in particular in the mechatronic control element thereof. This enables unappealing design features, such as joints and/or materiality differences and/or the lack of straight alignment to be avoided, and thus also a design in which the position of the sensor is exposed. In addition, a space-efficient integration of the sensor is obtained.

A further aspect of the invention relates to a motor vehicle having an electronic component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
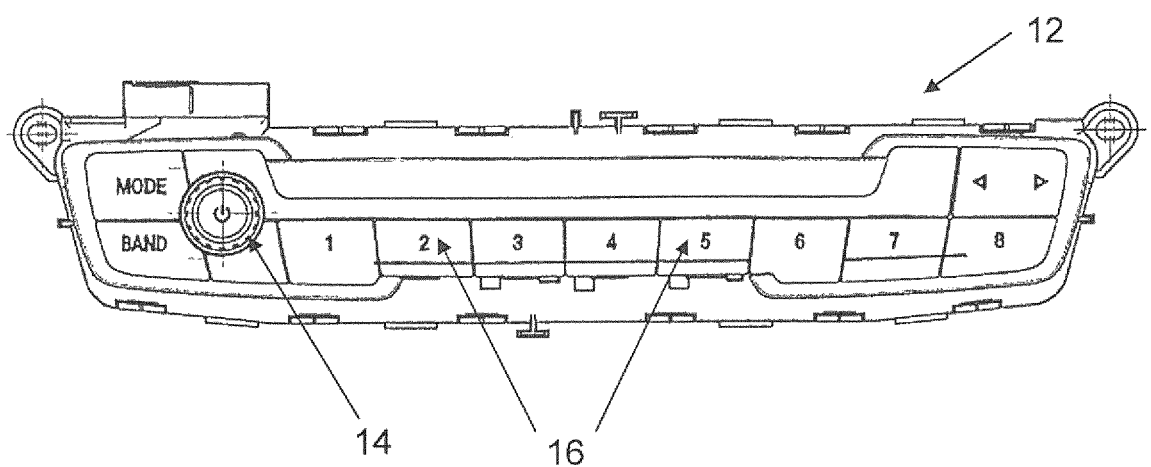
FIG. 1 is a front view of an electronic component having a control element.

In the following, the control element, the electronic component, the motor vehicle and other features and advantages, which are shown schematically in the drawings, are explained in more detail on the basis of an exemplary embodiment.

FIG. 1 shows an electronic component 12 of a motor vehicle, which vehicle is not shown in any detail.

The electronic component 12 in this case is configured as an audio control panel and has a control element 14, in particular a mechatronic control element, which is configured as a rotary control. In addition to the control element 14, the electronic component 12 has a plurality of additional function buttons 16 for operating the audio control panel.

Figure 2:
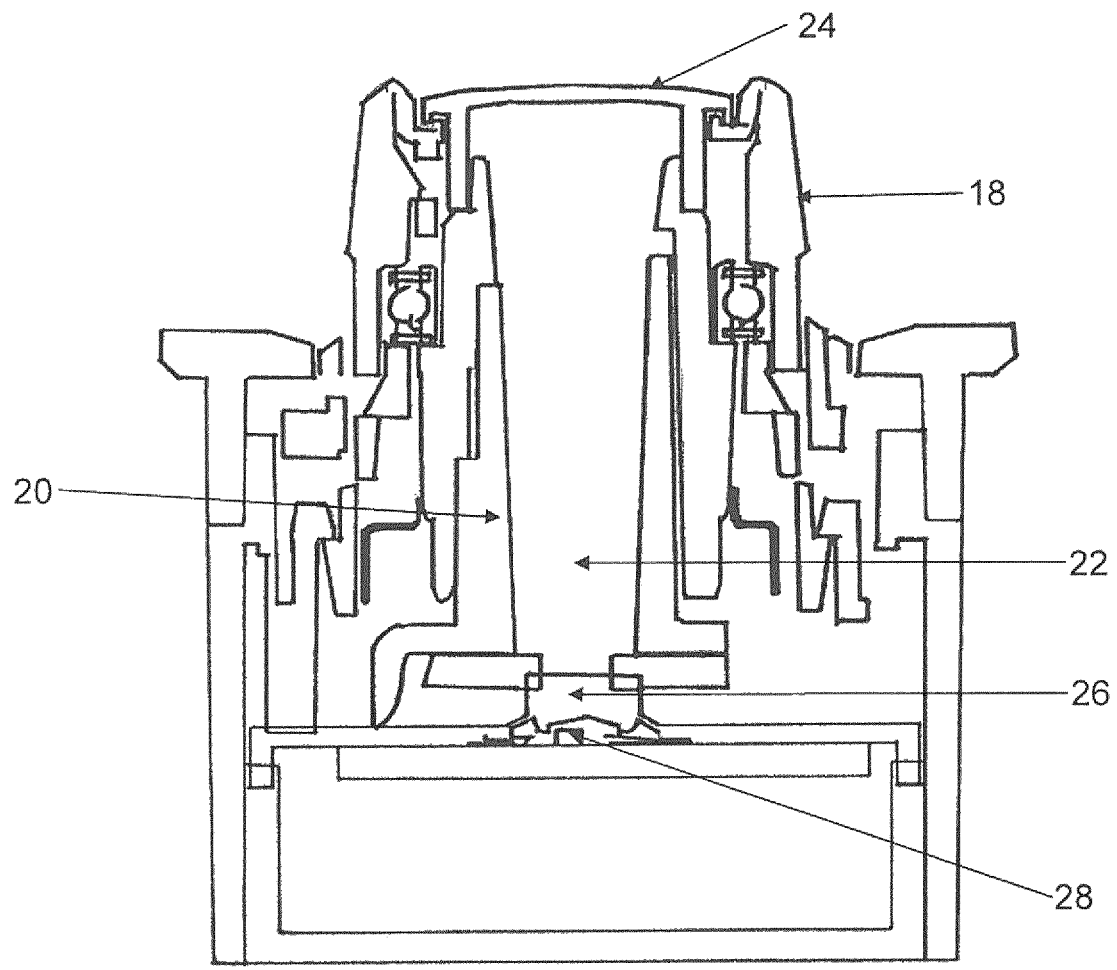
FIG. 2 is an enlarged detail of a longitudinal section through the control element shown in FIG. 1.

As can be seen in FIG. 2, the control element 14 has a handling element 18, a core 20 and a sensor 22. The handling element 18 can be used to set one or more functions of the audio control panel. For this purpose, the handling element 18 is rotatable about a rotary control axis. The core 20 is stationary relative to the handling element 18. The handling element 18 can therefore be rotated relative to the core. The sensor 22 is arranged, in particular integrated, in the stationary core 20.

The sensor 22 in this case is configured as a temperature sensor, in particular as an interior temperature sensor for a motor vehicle air conditioning system. The sensor 22 is integrated in the stationary core 20 and also has a cap 24 and an interface 26. The cap 24 serves as a functional and design cap for the control element 14 and is connected to the handling element 18 in a positive-fitting and/or materially bonded manner. Furthermore, the cap 24 protects the sensor 22 against environmental influences, such as dust, dirt or moisture. Via the interface 26, the measurements taken by way of the sensor 22 are transmitted to a control device of the motor vehicle air conditioning system (not shown) to control the interior temperature in the passenger compartment. In the present case the interface 26 has a plurality of plug contacts 28, which are inserted into a plug connection of the electronic component 12, in particular of the audio control panel.

The sensor 22, configured as a temperature sensor, can be implemented by various physical processes, for example using NTC sensors or IR sensors. The sensor surface, or in other words, the cap 24, must then be designed using a material suitable for the temperature measurement.

For example, in the case of an NTC sensor the cap 24 is made of brass, and in the case of an IR sensor from an IR-radiation-permeable plastic.

In the present case, the sensor 22 is integrated in a core 20, which is stationary with respect to the handling element 18 of the control element 14. In an embodiment not shown, the control element 14 can be fitted with a non-stationary core 20, the sensor 22 then being integrated on the rotary control axis. For the transmission of the measurements a suitable contact system must then be selected, such as a slider spring system or an optical signal transmission system.

The control element 14 in this case is configured as a rotary control of an audio control panel. In addition, the control element 14 can also be configured as a rotary control of an infotainment system. In addition to the integration of the sensor 22 in a rotary control, the sensor 22 can also be integrated in a button.

The integration of the sensor 22, which in the present case is configured as a temperature sensor, in particular an interior temperature sensor for a motor vehicle air conditioning system, into a control element 14, in particular into a mechatronic control element, avoids a design of the sensor 22 in an exposed situation and achieves a space-efficient integration. In addition, this avoids the use of additional joints, which can detract from the visual appeal. In addition, the geometric installation space is reduced. Finally, the integration of the sensor 22 in a control element 14 offers a functional advantage, since the masking or influencing of the sensor value is avoided.

Instead of a temperature sensor, another type of sensor such as an air quality sensor, a humidity sensor, a gesture sensor, a proximity sensor or a brightness sensor can also be integrated in the control element 14.

LIST OF REFERENCE NUMERALS

12 electronic component
14 control element
16 function button
18 handling element
20 core
22 sensor
24 cap
26 interface
28 plug contact The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for an electronic component, comprising:
    a control element for the electronic component; and
    a sensor integrated in the control element, wherein
        the sensor is configured to sense a property that is unrelated to an operation of the control element,
        the control element comprises:
            a core and a handling element, the handling element surrounding the core, and
            the core is stationary and the handling element is movable relative to the stationary core, the sensor being integrated in the core.

2. The apparatus as claimed in claim 1, wherein the control element for the electronic component is a mechatronic control element of a motor vehicle.

3. The apparatus as claimed in claim 1, wherein the sensor has a cap, said cap being integrated in the handling element.

4. The apparatus as claimed in claim 3, wherein a material of the cap is selected based on a measuring method of the sensor.

5. The apparatus as claimed in claim 2, wherein the sensor has an interface for transferring measurements to a motor vehicle air conditioning system of the motor vehicle.

6. The apparatus as claimed in claim 2, wherein the control element is configured as a rotary control.

7. The apparatus as claimed in claim 1, wherein the sensor is one of: a temperature sensor, an air quality sensor, a humidity sensor, a gesture sensor, a proximity sensor or a brightness sensor.

8. The apparatus as claimed in claim 2, wherein the sensor is one of: a temperature sensor, an air quality sensor, a humidity sensor, a gesture sensor, a proximity sensor or a brightness sensor.

9. The apparatus as claimed in claim 7, wherein the temperature sensor is an NTC sensor.

10. The apparatus as claimed in claim 7, wherein the temperature sensor is an IR sensor.

11. The apparatus as claimed in claim 1, wherein the core is rotationally fixed and the sensor, which is integrated in the core, tracks a longitudinal motion.

12. A motor vehicle, comprising:
    an electronic component; and
    a control element for the electronic control element, wherein a sensor is integrated in the control element, wherein
        the sensor is configured to sense a property that is unrelated to an operation of the control element,
        the control element for the electronic component is a mechatronic control element of a motor vehicle,
        the control element comprises:
            a core and a handling element, the handling element surrounding the core, and
            the core is stationary and the handling element is movable relative to the stationary core, the sensor being integrated in the core.

* * * * *